United States Patent
Bhat et al.

(10) Patent No.: US 10,051,045 B2
(45) Date of Patent: *Aug. 14, 2018

(54) SEARCHING CONTENT ASSOCIATED WITH MULTIPLE APPLICATIONS

(71) Applicant: AirWatch LLC, Atlanta, GA (US)

(72) Inventors: Manjunath Bhat, Bangalore (IN); Vivek Ratilal Vekariya, Bangalore (IN); Raghvendra Singh, Bangalore (IN); Dheeraj Bhati, Bangalore (IN)

(73) Assignee: AirWatch LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/851,016

(22) Filed: Dec. 21, 2017

(65) Prior Publication Data

US 2018/0115599 A1    Apr. 26, 2018

Related U.S. Application Data

(63) Continuation of application No. 14/834,440, filed on Aug. 25, 2015, now Pat. No. 9,854,030.

(30) Foreign Application Priority Data

Jun. 11, 2015 (IN) .......................... 2937/CHE/2015
Jun. 29, 2015 (IN) .......................... 3284/CHE/2015

(51) Int. Cl.
*G06F 21/00* (2013.01)
*G06F 17/30* (2006.01)
*H04L 29/06* (2006.01)
*H04L 29/08* (2006.01)
*G06F 8/61* (2018.01)
(Continued)

(52) U.S. Cl.
CPC ............... *H04L 67/10* (2013.01); *G06F 8/61* (2013.01); *G06F 17/30893* (2013.01); *G06F 21/6218* (2013.01); *H04L 63/06* (2013.01); *H04L 63/10* (2013.01)

(58) Field of Classification Search
None
See application file for complete search history.

(56) References Cited

U.S. PATENT DOCUMENTS 8,959,087 B2 * 2/2015 Joshi ................. G06F 17/30572
707/734
2005/0289109 A1 * 12/2005 Arrouye ............... G06F 17/301
(Continued)

OTHER PUBLICATIONS

Office Action dated Jun. 30, 2017 for U.S. Appl. No. 14/968,914.

*Primary Examiner* — Eric Chen
(74) *Attorney, Agent, or Firm* — Thomas Horstemeyer, LLP (VMW)

(57) ABSTRACT

Disclosed are examples that relate to searching for content associated with applications. In various examples, a system can include a computing device and a search interface component executable by the computing device. The search interface component can cause the computing device to obtain and validate a search query from a search component. The search interface component can search a search index of restricted application content that corresponds with the search query. The restricted application content is associated with a sandbox for a restricted application. The search interface component can also cause the computing device to provide search results to the search component.

20 Claims, 6 Drawing Sheets

(51) Int. Cl.
*G06F 21/62* (2013.01)
*G06F 7/04* (2006.01)
*G06F 15/16* (2006.01)

(56) References Cited

U.S. PATENT DOCUMENTS

| | | |
|---|---|---|
| 2005/0289644 A1 | 12/2005 | Wray |
| 2006/0168222 A1 | 7/2006 | Saxena |
| 2007/0150446 A1 | 6/2007 | Gurevich et al. |
| 2008/0222108 A1* | 9/2008 | Prahlad ............. G06F 17/30616 |
| 2012/0124035 A1* | 5/2012 | Vaidyanathan ... G06F 17/30964 |
| | | 707/723 |
| 2012/0124072 A1* | 5/2012 | Vaidyanathan ... G06F 17/30964 |
| | | 707/767 |
| 2012/0124519 A1* | 5/2012 | Uphoff .............. G06F 17/30964 |
| | | 715/811 |
| 2012/0131683 A1* | 5/2012 | Nassar .................. G06F 17/301 |
| | | 726/28 |
| 2015/0026212 A1* | 1/2015 | Fink ................... G06F 17/30483 |
| | | 707/774 |
| 2015/0113092 A1* | 4/2015 | Chadha ................... G06F 3/067 |
| | | 709/214 |
| 2015/0289109 A1 | 10/2015 | Lubeck et al. |
| 2015/0317388 A1* | 11/2015 | Roh ................... G06F 17/30696 |
| | | 707/722 |

\* cited by examiner

SEARCHING CONTENT ASSOCIATED WITH MULTIPLE APPLICATIONS

CROSS-REFERENCE TO RELATED APPLICATIONS

This application is a continuation application that claims the benefit of, and priority to, co-pending U.S. patent application Ser. No. 14/834,440 entitled "Searching Content Associated with Multiple Applications" filed on Aug. 25, 2015, which claims the benefit, under 35 U.S.C. 119(a)-(d), to Foreign application Serial No. 2937/CHE/2015 filed in India entitled "Searching Content Associated with Multiple Applications", on Jun. 11, 2015, by AIRWATCH LLC, and Foreign application Serial No. 3284/CHE/2015 filed in India entitled "SEARCHING CONTENT ASSOCIATED WITH MULTIPLE APPLICATIONS", on Jun. 29, 2015, by AIRWATCH LLC, and U.S. application Ser. No. 14/834,440 filed on Aug. 25, 2015, which is herein incorporated in its entirety by reference for all purposes.

BACKGROUND

Users of computing devices often use applications to process and store data files that can include various types of content. For example, a user can use a word processing application to create, edit, and store word processing documents. When the user wants to view or edit the content in the word processing document, the user can operate the word processing application to open the file and render the content.

Over time, a user can store a large quantity of files. Eventually, it can become difficult for the user to locate a particular file due to the large quantity of files that a user can accumulate. In addition, it is common for multiple users to store files in the same storage system so that each user has access to all of the files in the storage system. However, the number of files stored by the multiple users can make it difficult for one user to find and access a particular file.

Search engines can facilitate a user finding files that match search queries. However, search engines often do not have the ability to search for content that is restricted from access for various reasons.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to searching for content for which access can be restricted. In some examples, multiple applications can be installed in a client device, and application content can be stored in the client device. The client device can isolate application content so that a particular application can only access its respective application content. In other words, the client device can implement sandboxes, which can isolate application data and code execution from other applications.

A search component and a search interface component can be installed in the client device. The search component may not have permission to communicate with the applications, but the search interface component can communicate with the applications. When a user provides the search component with a search query, the search component can transfer the search query to the search interface component. Then, the search interface component can communicate with the applications to perform a search and obtain search results that correspond to the search query.

In the following discussion, examples of systems and their components are described, followed by examples of the operation of those systems.

Figure 1:
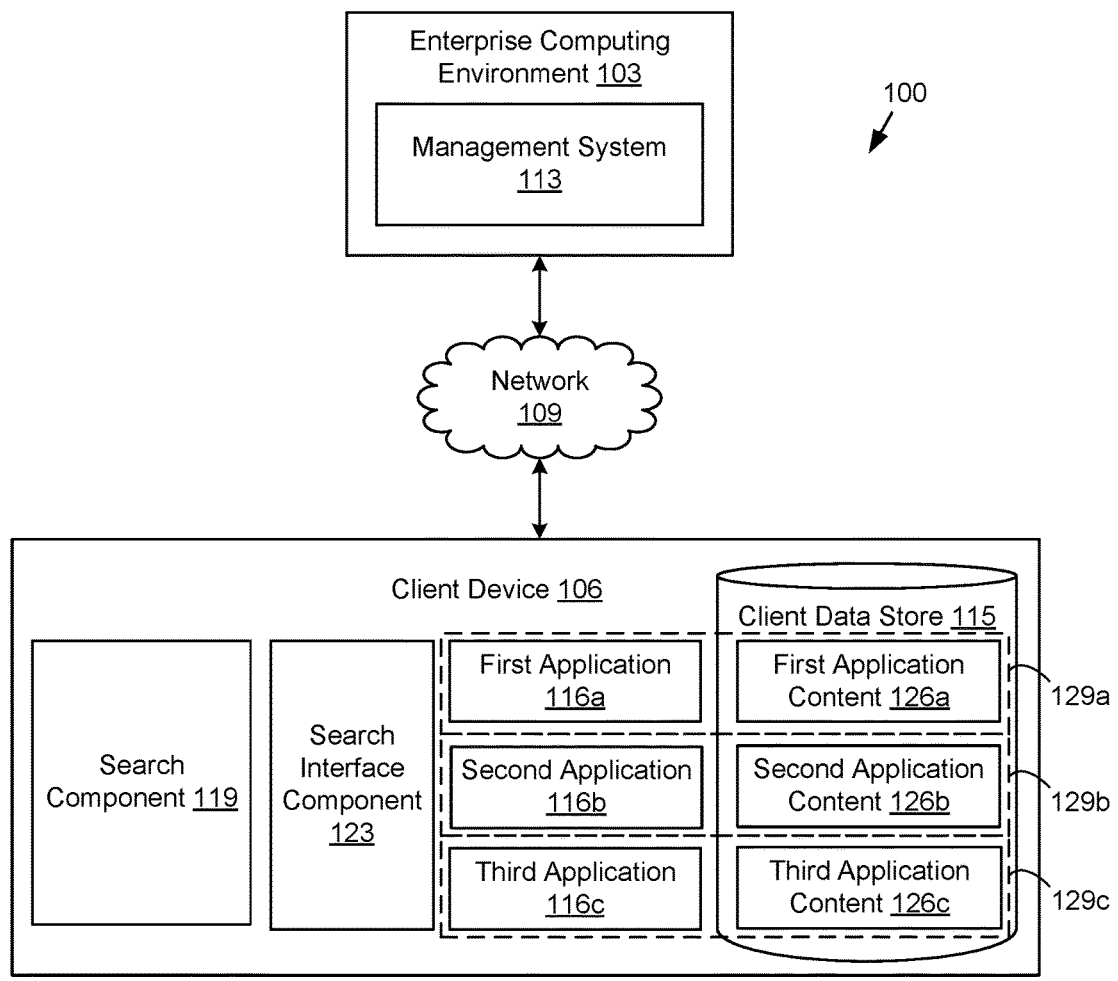
FIG. 1 is a drawing of an example of a networked environment.

With reference to FIG. 1, shown is an example of a networked environment 100. The networked environment 100 can include an enterprise computing environment 103 and a client device 106 in data communication through a network 109. The network 109 can include the Internet, one or more intranets, extranets, wide area networks (WANs), local area networks (LANs), wired networks, wireless networks, or any combination of two or more such networks. The network 109 can include satellite networks, cable networks, Ethernet networks, and telephony networks.

The enterprise computing environment 103 can be a computing environment operated by one or more enterprises, such as businesses or other organizations. The enterprise computing environment 103 can include a computing device, such as a server computer, that provides computing capabilities. Alternatively, the enterprise computing environment 103 can include multiple computing devices arranged in one or more server banks or computer banks. For examples in which the enterprise computing environment 103 includes multiple computing devices, the computing devices can be located in a single installation, or the computing devices can be distributed among multiple different geographical locations.

In some examples, the enterprise computing environment 103 can include computing devices that together form a hosted computing resource or a grid computing resource. In other examples, the enterprise computing environment 103 can operate as an elastic computing resource for which the allotted capacity of computing-related resources, such as processing resources, network resources, and storage resources, can vary over time. In other examples, the enterprise computing environment 103 can include or be operated as one or more virtualized computer instances that can be executed in order to perform the functionality that is described herein.

The enterprise computing environment 103 can include various systems. For example, the enterprise computing environment 103 can include a management service 113 that can monitor and manage the operation of client devices 106 associated with the enterprise that operates the enterprise computing environment 103. In some examples, the management service 113 can manage and oversee the operation of multiple client devices 106 enrolled in a mobile device management service that is provided by the management service 113. The management service 113 can also provide the client devices 106 with access to email, calendar data, contact information, and other resources associated with the enterprise.

The management service 113 can assign various compliance rules to respective client devices 106. The compliance rules can specify, for example, one or more conditions that must be satisfied for a respective client device 106 to be deemed compliant with the compliance rule. In one example, a compliance rule can specify that particular applications are prohibited from being installed in a client device 106. In another example, a compliance rule can specify that a lock screen is required to be generated when the client device 106 is "awoken" from a low power "sleep" state and that a passcode is required for a user to unlock the lock screen. Some compliance rules can be based on time, geographical location, or network properties. For instance, a compliance rule can be satisfied when a client device 106 is located within a particular geographic location.

A compliance rule in another example can be satisfied when the client device 106 is in communication with a particular network 109, such as a particular local area network that is managed by the enterprise computing environment 103. Furthermore, a compliance rule in another example can be satisfied upon the time and date matching specified values.

Another example of a compliance rule involves whether a user belongs to a particular group of authorized users. A compliance rule can include a whitelist or a blacklist that specifies whether particular users or groups of users are authorized users. In various examples, the enterprise computing environment 103, the client device 106, or a combination of both the enterprise computing environment 103 and the client device 106 can determine whether a client device 106 satisfies a compliance rule.

In some examples, an enterprise can operate the management service 113 to ensure that the client devices 106 of its users satisfy various compliance rules. By ensuring that the client devices 106 of its users are operating in compliance with the compliance rules, the enterprise can control access to resources to thereby improve the security of devices associated with the enterprise and the users of the client devices 106.

The client device 106 is representative of multiple client devices 106 that can be coupled to the network 109. The client device 106 can include a processor-based computer system, such as a desktop computer, a laptop computer, a personal digital assistant, a mobile phone, or a tablet computer. The client device 106 can include output devices, such as a display and audio speakers, as well as one or more input devices, such as a mouse, keyboard, touch pad, or touch screen, which can facilitate a user interacting with and controlling the client device 106. In addition, the client device 106 can include a client data store 115, which can store data associated with the client device 106.

The client device 106 can include a first application 116a, a second application 116b a third application 116c, a search component 119, and a search interface component 123. The first application 116a, the second application 116b, and the third application 116c, referred to collectively as the applications 116, can include sets of computer programs that can perform various functionality. As one example, the first application 116a can include a word processing application, the second application 116b can include a media player that can render multimedia, and the third application 116c can include an email client that can send and receive email messages. The applications 116 can be developed and provided by the enterprise that operates the enterprise computing environment 103. In addition, the applications 116 can be secured applications. In this regard, enterprise security libraries can be included in the applications 116, and the management service 113 can monitor and control the applications 116.

The applications 116 can be associated with first application content 126a, second application content 126b, and third application content 126c, respectively, that is stored in the client data store 115. The application content 126 can include files and other types of data that the corresponding applications 116 can access and process. The first application 116a can access and process the first application content 126a, the second application 116b can access and process the second application content 126b, and the third application 116c can access and process the third application content 126c.

As will be described in further detail below, the search component 119 can communicate with the search interface component 123 and cause the search interface component 123 to perform content searches. The search component 119 can also generate one or more user interfaces that can facilitate user interactions. A user interface can include an input region that can facilitate a user inputting search queries. In some examples, the search component 119 can be an application installed in the client device 106. In alternative examples, the search component 119 can be a component of an application, such as an application widget, that is installed in the client device 106. In other examples, the search component 119 can be a plugin, such as a third-party plugin, for an application.

In some examples, the search component 119 can be a managed component. In this regard, the search component 119 can incorporate security libraries to enable the search component 119 to provide management capabilities required by the management service 113. The management capabilities can include configuration, authentication, connectivity, data loss prevention, and auditing capabilities, which can enhance the security of the search component 119. In addition, when the search component 119 is a managed component, the search component 119 can include a communication key that can be used during communication with the search interface component 123, as will be described in further detail below.

In one approach, the search component 119 can be a managed component through usage of a software development kit (SDK) distributed by, for example, the enterprise that operates the enterprise computing environment 103. The SDK can provide the developer of the search component 119 with a development environment that facilitates integrating security libraries and a communication key into the search component 119. Using the SDK, the developer can modify the source code of the search component 119 to include the security libraries provided by the SDK. After the source code has been modified to include the security libraries, the source code can be compiled, and that the search component 119 can be deemed a managed component by the management service 113.

In another approach, the search component 119 can be a managed component through a process known as "wrapping." To wrap the search component 119, an application wrapper in the management service 113 can decompile compiled code for the search component 119. The application wrapper can then integrate security libraries and a communication key with the decompiled code. Then, the application wrapper can compile the modified code. Thus, through the process of wrapping, the search component 119 can be deemed a managed component by the management service 113.

The search interface component 123 can receive and process search requests submitted from the search component 119, as will be described in further detail below. In some examples, the search interface component 123 can include an application installed in the client device 106. In addition, in some examples, the search interface component 123 can operate as a background process. In this regard, the search interface component 123 can operate without presenting user interfaces for display to the user of the client device 106.

The client device 106 can also include an operating system that can create sandboxes 129a-129c, referred to collectively as sandboxes 129, for the respective applications 116. The sandboxes 129 can be regarded as being virtual containers for the respective applications 116. The sandboxes 129 can isolate resources, such as code and the application content 126, for the respective applications 116. For example, the sandbox 129a can isolate the first application content 126a so that only the first application 116a can retrieve the first application content 126a from the client data store 115. In other words, the first application 116a can access the first application content 126a from the client data store 115, but the search component 119, the search interface component 123, the second application 116b, and the third application 116c cannot retrieve the first application content 126a from the client data store 115.

The operating system can also restrict the transfer of at least some types of data between components in the client device 106 based on various protection models. In some examples, the operating system can enforce a signature-based protection model as wells as a permissions-based protection model. If a component is protected using the signature-based protection model, the operating system can allow the component to transfer data to only other components that are signed with the same certificate key. Thus, if a component subject to the signature-based protection model is signed with a certificate key that differs from another component, the operating system of the client device 106 can prohibit the component from sharing at least some data with the other component. In some examples, the search interface component 123 and the applications 116 are signed with the same certificate key, but the search component 119 is not signed with that certificate key. Additionally, the operating system can enforce a signature-based protection model for the applications 116. Accordingly, the operating system can allow the applications 116 to transfer the application content 126 to the search interface component 123, but the operating system can prevent the applications 116 from transferring the application 116 to the search component 119.

If a component is protected using the permissions-based protection model, the operating system can allow the component to transfer data to only other components that have the same permissions as those assigned to the component. A permission for a component can specify, for example, whether a component is permitted to access a global positioning system (GPS). Another example of a permission can specify whether the component is permitted access a particular storage location. If a component subject to the permissions-based protection model has permissions that differ from another component, the operating system of the client device 106 can prohibit the component from sharing at least some data with the other component. In some examples, the operating system can enforce a permissions-based security model for the search interface component 123, and the search component 119 and the search interface component 123 can have the same permissions. Accordingly, the operating system can allow the search interface component 123 to transfer data to the search component 119.

Next, examples of the operation of the networked environment 100 are described. To begin, the search component 119, the search interface component 123, and the applications 116 can be installed in the client device 106. When the applications 116 are installed in the client device 106, the applications 116 can report to the search interface component 123 to notify the search interface component 123 that the applications 116 are present in the client device 106. Additionally, when an application 116 is being uninstalled from the client device 106, the application 116 can report to the search interface component 123, to notify the search interface component 123 that the application 116 is being removed from the client device 106. In this way, the search interface component 123 can determine which applications 116 the search interface component 123 can query during a search or indexing operation.

As the client device 106 operates, the applications 116 can store various application content 126 in the client data store 115. For example, the first application 116a can include first application content 126a that includes word processing documents, the second application 116b can store second application content 126b that includes multimedia files, and the third application 116c can store third application content 126c that includes email messages. The application content 126 can be stored in the client data store 115 and isolated by virtue of the sandboxes 129 that are established by the operating system.

Next, examples of a search being performed in the client device 106 are described. A user can operate the search component 119 to perform a search. For example, the user can input a search query into a user interface generated by the search component 119. The search query can include a text string. For instance, the user can input the text string of "accounting records" to search for information corresponding to accounting records that are associated with the applications 116.

Upon receiving the user's search query, the search component 119 can provide the search query to the search interface component 123. In some examples, the search interface component 123 can be protected using a permissions-based protection model. As such, the operating system of the client device 106 can allow the search interface component 123 to communicate and share data with the search component 119 only if the search component 119 and search interface component 123 share the same permissions.

In some examples, the application content 126 can include restricted content, such as enterprise content, that the management service 113 and the client device 106 monitors and prevents from unauthorized access. As such, the search interface component 123 can determine whether the search interface component 123 is authorized to perform searches for the search component 119. To determine whether the search interface component 123 is authorized to perform a search on behalf of the search component 119, the search component 119 can provide a key to the search interface component 123. In some examples, the key can be seeded with the search component 119 when the search component 119 is developed into a managed component using, for example an SDK or wrapping processing as described above. When the search interface component 123 receives a search query from the search component 119, the search interface component 123 can determine whether the search interface component 123 also received an authentic key. To determine whether the key is authentic, the search interface component 119 can compare the key to a predefined value that is indicative of an authentic key. If the key matches the predefined value, the search interface component 119 can determine that the key is authentic. In alternative examples, the search interface component 119 can communicate with the management system 113 and request the management system 119 to provide the search interface component 123 with a notification of whether the received key is authentic.

After the search interface component 123 has received the search query from the search component 119, and after the search interface component 123 has authenticated the key, the search interface component 123 can search for application content 126 that corresponds to the received search query. The search interface component 123 can perform the search in various ways, as will now be described.

In one approach, the search interface component 123 can perform the search by requesting the respective applications 116 to search for application content 126 that corresponds to the search query. In other words, the search interface component 123 can submit a first request to the first application 116*a*, a second request to the second application 116*b*, and a third request to the third application 116*c*. The requests can query the applications 116 to provide search results that represent the application content 126 that corresponds to the search request. For example, the first application content 126 can respond with a list of word processing documents that include text that matches the search query, the second application 116*b* can respond with a list of multimedia files having metadata that matches the search query, and the third application 116*c* can respond with a list of email messages that include text that correspond to the search query. The applications 116 can perform search algorithms that return search results based on the search query, including terms that are related to the search query, such as synonyms.

In another approach, the search interface component 123 can perform the search by searching a search index that is accessible to the search interface component 123. The search index can represent terms as wells as references to the application content 126 that correspond to the respective terms. For example, a search index can include the term "handbook" and identify the instances of application content 126 that correspond to the term "handbook." Thus, when the search interface component 123 receives a search query from the search component 119, the search interface component 123 can search the search index to generate corresponding search results.

The search index can be generated in various ways. In some examples, the search interface component 123 can periodically crawl the application content 126 stored in the client data store 115 to update the search index with information collected during the crawl. In other examples, the search interface component 123 can generate and update the search index based on search results provided by the applications 116 in response to other searches. For example, when the applications 116 provide search results to the search interface component 123, the search interface component 123 can store information from the search results in the search index. Thus, the search interface component 123 can maintain a search index that can be updated based on the search results provided by the applications 116.

Once the search interface component 123 obtains search results for a search query, the search interface component 123 can provide the search results to the search component 119. Thus, for examples in which the applications 116 provide search results to the search interface component 123, the search interface component 123 can forward the search results to the search component 119. For examples in which the search interface component 123 generates the search results based on a search index, the search interface component 123 can provide the generated search results to the search component 119.

The search interface component 123 can also cache search results that the applications 116 can provide or that the search interface component 123 can generate. In these examples, the once the search interface component 123 obtains a search result, the search interface component 123 can store the search result in a cache in which the search result is stored for a configurable amount of time. If the search component 119 submits a search query that is the same or similar to the search query for a cached search result, the search interface component 123 can retrieve the cached search result and provide the cached search result to the search component 119. By providing the search component 119 with cached search results, the search interface component 123 can avoid performing the steps required to generate or request a new search result.

After the search interface component 123 provides search results to the search component 119, the search component 119 can render the search results for presentation to a user of the client device 106. A rendered search result can represent various information associated with the search result. For example, the rendered search result can identify the particular application content 126 that corresponds to the search result as well as the particular application 116 to which the application content 126 corresponds. The rendered search result can represent metadata for the application content 126 that corresponds to the search result, such as a file's name, creator, and creation date. The rendered search result can also include information that can facilitate a user determining whether the user wants to retrieve the application content 126 that corresponds to the search result. For example, the rendered search result can include a preview or a brief summary of the corresponding application content 126.

A user of the client device 106 can use the search component 119 to select one or more of the search results and request to access the corresponding data. Upon receiving the user's selection, the search interface component 123 can notify the search interface component 123 that the user requests to access the corresponding application content 126.

After the search interface component 123 receives notification that the user requested to access the application content 126, the search interface component 123 can provide the user with the requested application content 126. The search component 119 can also provide the search interface component 123 with a communication key, so that the search interface component 123 can determine whether the search component 119 is authorized to access the requested application content 126. In some examples, in response to receiving a request from the search component 119 to access particular application content 126, the search interface component 123 can cause the application 116 that corresponds to the application content 126 to become active and instruct the application 116 to open the corresponding application content 126. For instance, if the user requested to access a file in the first application content 126, the search interface component 123 can cause the first application 116*a* to become active and to open the specified file.

In an alternative approach, when the search interface component 123 receives a notification that the user requests to access application content 126 corresponding to a search result, the search interface component 123 can request the corresponding application 116 to provide the application content 126 to the search interface component 123 and then transfer the application content 126 to the search component 119. For example, if the search component 119 notifies the search interface component 123 that the user requests to access first application content 126a, the search interface component 123 can request the first application 116a to provide the first application content 126a to the search interface component 123. After the search interface component 123 receives the requested first application content 126a from the first application 116a, the search interface component 123 can transfer the received first application content 126a to the search component 119.

In some examples in which the search interface component 123 transfers the requested application content 126 to the search component 119, the search interface component 123 can also cache the application content 126 for later use. In these examples, the search interface component 123 can store the retrieved application content 126 in a cache for a configurable amount of time. If the search component 119 submits a subsequent request for the same application content 126, the search interface component 123 can retrieve the application content 126 from the cache and provide the application content 126 to the search component 119. In this way, the search interface component 123 can reduce the amount of time and computing resources required to provide the search component 119 with the requested application content 126.

In some examples, the search interface component 123 can also extract information from the retrieved application content 126 for various purposes. For example, the search interface component 123 can determine that application content 126 indicates that the user of the client device 106 is scheduled to attend an event. Using this information, the search interface component 123 can set reminders for the event and generate alerts that remind the user of the scheduled event.

When the search interface component 123 receives a search query from the search component 119, the search interface component 123 can also initiate a web search for web site content, including third-party web site content, that corresponds to the search query. To this end, the search interface component 123 can communicate with a web page search engine though an application program interface (API). In various examples, the search engine can be an enterprise search engine operated by the management service 113 or a third-party search engine that is not operated by the management service 113. Using the API, the search interface component 123 can request the search engine to provide search results that correspond to the search query. When the search interface component 123 receives search results from the web page search engine, the search interface component 123 can provide the search component 119 with the received search results along with the search results based on the application content 126.

In some examples, devices that are in communication with the management service 113 through the network 109 can search for application content 126 stored in the client data store 115. To this end, the management service 113 can include a messaging server that can relay messages between the client device 106 and other devices. A device enrolled with service through the management service 113 can include a search component 119 that can cause the client device 106 to transmit a message to the messaging server to request the search interface component 123 to perform a search. The message transmitted by the device can include a payload that specifies that the message includes the search query, a destination identifier that represents the client device 106, and a string that represents the search query.

When the messaging server receives the message, the messaging server can determine that the message is intended for the client device 106 based on the destination identifier included in the payload of the message. Upon identifying the client device 106, the messaging server can forward the message to the client device 106.

When the client device 106 receives the message from the messaging server, the client device 106 can provide the message to the search interface component 123, which can perform a search using one or more of the approaches described above to generate search results. The search interface component 123 can then transmit the search results to the messaging server. In particular, the search interface component 123 can transmit a message that includes a payload that specifies that the message includes search results, a destination identifier that represents the device that submitted the search query, and data that represents the search results.

Once the messaging server receives the message that includes the search results, the messaging server can parse the message and extract the destination identifier that represents the device that submitted the search query. After the messaging server identifies the device that submitted the search query, the messaging server can transmit the search result to search component 119 in the identified device. The device can then request and receive application content 126 for a selected search result using the messaging protocol described above. Thus, a device in communication with the management service 113 through the network 109 can search for and retrieve application content 126 stored in the client device 106. Additionally, a device can search for application content 126 in a group of client devices 106 by transmitting a message to the management service 113 with a payload the identifies the group of the client devices 106.

In other examples, a device can include a search component 119 that can communicate with the client device 106 through other communication protocols, such as a peer-to-peer protocol. In these examples, the search component 119 can cause the device to transmit a search query to the client device 106 through the network 109 without communicating with the management system 113. The search interface component 123 can receive the search query and perform a search using one or more of the approaches described above. The search interface component 123 can then transmit search results to the search component 119 in the remote device through the network 109 without the search results being relayed through the management system 113.

Figure 2:
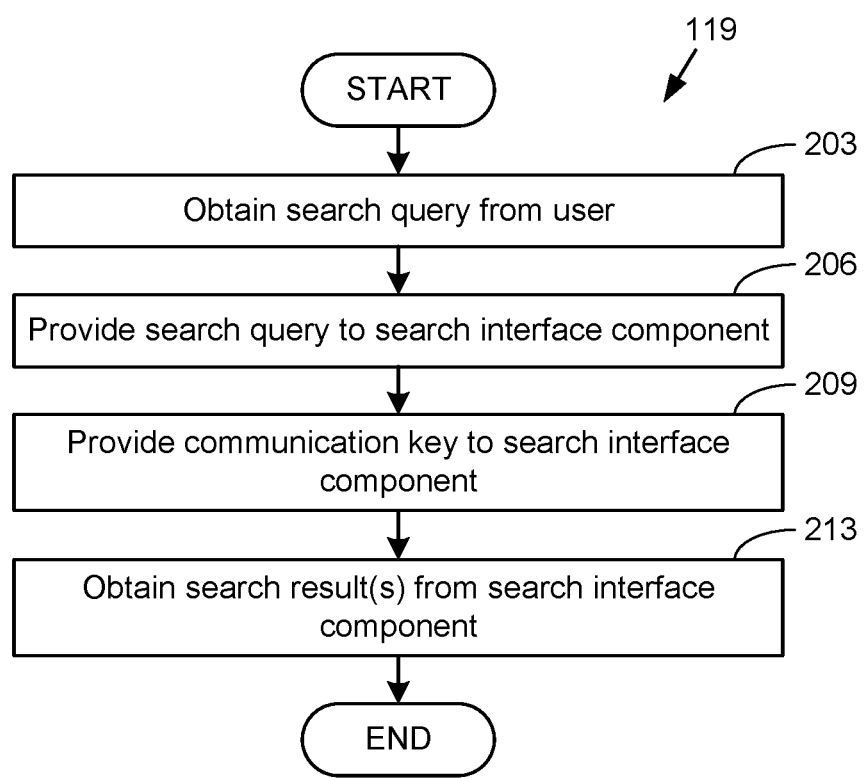
FIG. 2 is a flowchart illustrating an example of functionality implemented by a search component in a client device.

With reference to FIG. 2, shown is a flowchart that provides an example of a portion of the operation of the search component 119. In particular, FIG. 2 provides an example of the search component 119 providing a search query to the search interface component 123 and obtaining search results. The flowchart of FIG. 2 can be viewed as depicting an example of a method implemented in the client device 106.

Beginning with step 203, the search component 119 can obtain a search query from a user of the client device 106. In some examples, the search query can include a string of characters. For example, a user can input the text string of "safety presentations" in a user interface generated by the search component 119.

As shown at step 206, the search component 119 can then provide the received search query to the search interface component 123. As described above, the operating system of the client device 106 can enforce a permissions-based security model for the search interface component 123, and the search component 119 and the search interface component 123 can have the same permissions. Accordingly, the operating system can allow the search component 119 and the search interface component 123 to communicate with each other and transfer data between the components.

At step 209, the search component 119 can provide a communication key to the search interface component 123. As discussed above, the search interface component 123 can authenticate the communication key to determine whether the search interface component 123 is authorized to perform a search on behalf of the search component 119.

As indicated at step 213, the search component 119 can then obtain one or more search results from the search interface component 123. The search results can represent application content 126 that corresponds to the search result. For example, the search result can identify the particular application content 126 as well as the application 116 to which the application content 126 corresponds. The search result can also represent metadata for the application 116, such as a file's name, creator, and creation data. Thereafter, the process ends.

Figure 3A:
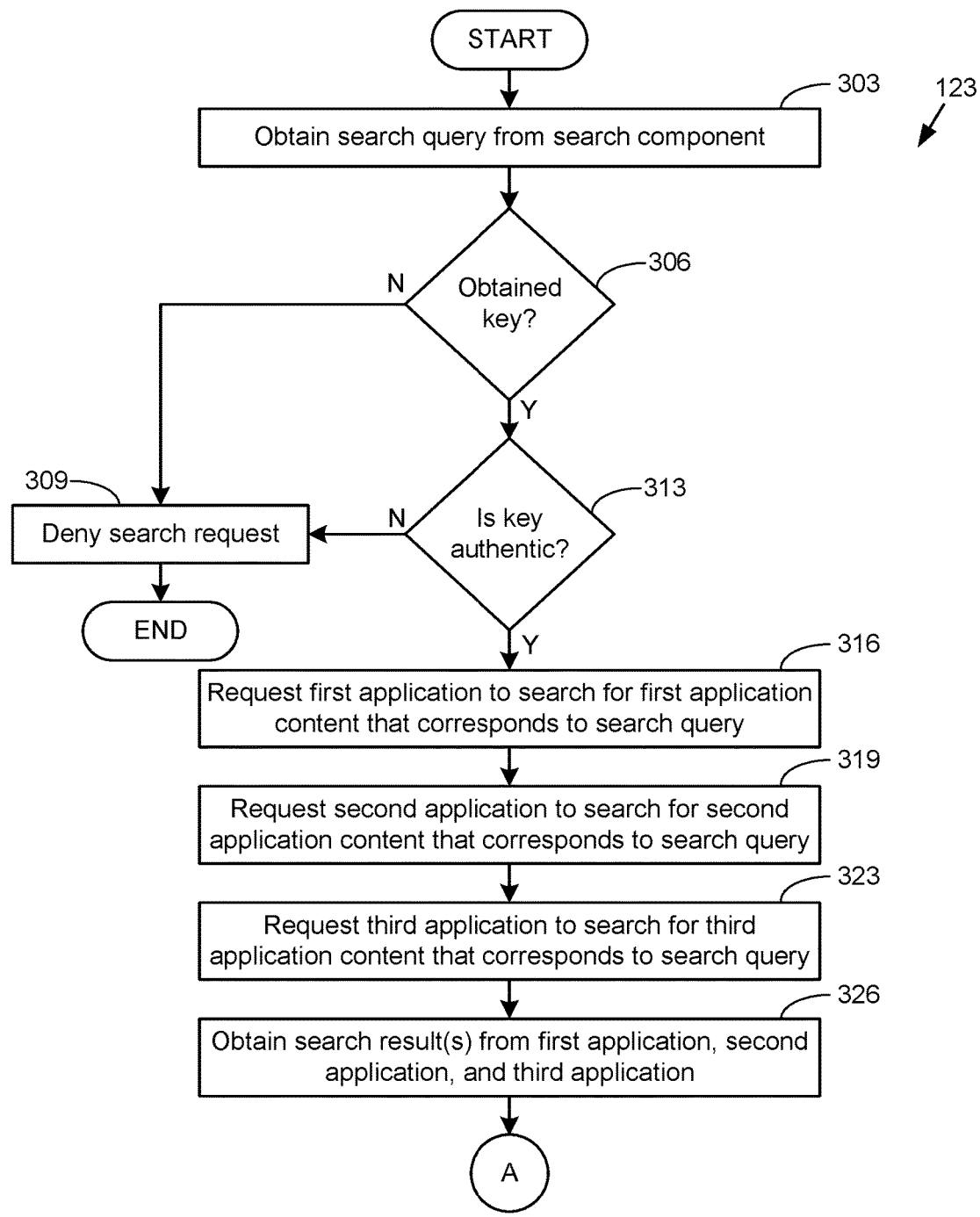
FIGS. 3A-3B and 4A-4B are flowcharts illustrating examples of functionality implemented by a search interface component in a client device.
Figure 3B:
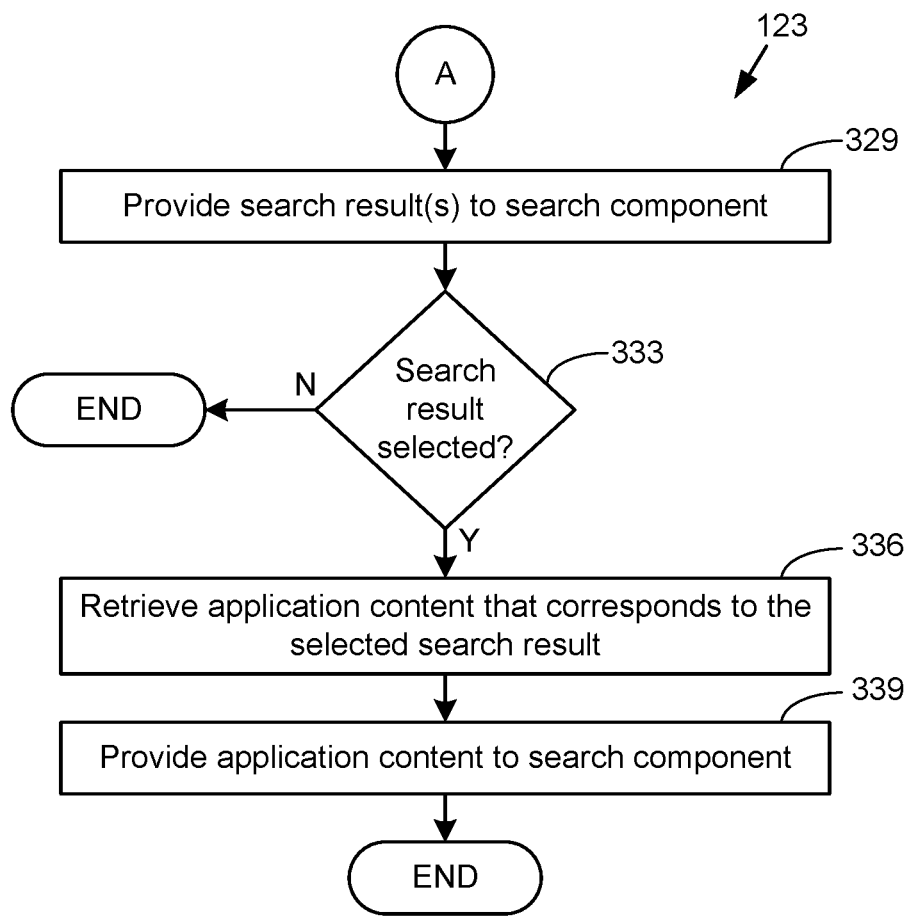

With reference to FIGS. 3A-3B, shown is a flowchart that provides an example of a portion of the operation of the search interface component 123. In particular, FIGS. 3A-3B provide an example of the search interface component 123 receiving a search query from the search component 119 and providing the search component 119 with search results. The flowchart of FIGS. 3A-3B can be viewed as depicting an example of a method implemented in the client device 106.

Beginning with step 303, the search interface component 123 can obtain a search query from the search component 119. The search query in some examples can include a string of text that the user of the client device 106 input into the search component 119.

At step 306, the search interface component 123 can then determine whether the search interface component 123 obtained a communication key from the search component 119. The communication key can indicate that the search interface component 123 is authorized to perform search at the request of the search component 119. In some examples, the communication key can be seeded in the search component 119 when the search component 119 is made into a managed component through the SDK or wrapping processes described above.

If the search interface component 123 did not obtain the communication key, the search interface component 123 can move to step 309 and deny the search request made by the search component 119. Otherwise, if the search interface component 123 did obtain a communication key, the search interface component 123 can move to step 313 and determine whether the received communication key is authentic. If the communication key is not authentic, the search interface component 123 can move to step 309 and deny the search request made by the search component 119.

If the communication key is authentic, the search interface component 123 can move to step 316. As indicated at step 316, the search interface component 123 can request the first application 116a to search for first application content that corresponds to the search query. Similarly, the search interface component 123 can request the second application 116b to search for second application content 126b that corresponds to the search query, as shown at step 319. In addition, the search interface component 123 can request the third application 116c to search for third application content 126c that corresponds to the search query, as indicated at step 323.

As shown at step 326, the search interface component 123 can then obtain one or more search results from the first application 116a, the second application 116b, and the third application 116c. The search results can represent application content 126 that corresponds to the search result. For example, the search result can identify the particular application content 126 as well as the application 116 to which the application content 126 corresponds. The search result can also represent metadata for the application 116, such as a file's name, creator, and creation data. The search interface component 123 can then move to step 329, which is shown in FIG. 3B. At step 329, the search interface component 123 can provide the received search results to the search component 119.

Then, as shown at step 333, the search interface component 123 can then determine whether the user of the client device 106 has selected one of the search results. To determine whether the user of the client device 106 has selected one of the search results, the search interface component 123 can determine whether the search interface component 123 has received a notification from the search component 119 that the user selected on of the search results. For example, the search component 119 can notify the search interface component 123 that the user selected a particular search result along with information that identifies the search result as well as the application content 126 that corresponds to the search result. If a user did not select a search result, the process ends.

Otherwise, if the user selected a search result, the search interface component 123 can move to step 336 and retrieve the application content 126 that corresponds to the selected search result. In some examples, the search interface component 123 can retrieve the specified application content 126 by requesting the corresponding application 116 to transfer the application content 126 to the search interface component 123. In other examples, the search interface component 123 can access the client data store 115 to retrieve the application content 126.

After the search interface component 123 has obtained the application content 126, the search interface component 123 can move to step 339 and provide the retrieved content to the search component 119. In alternative examples, instead of retrieving the application content 126 and providing the application content 126 to the search component 119, the search interface component 123 can cause the application 116 for the application content 126 to become active in the client device 106. In addition, the search interface component 123 can instruct the application 116 to open the application content 126 that corresponds to the selected search result. Thereafter, the process ends.

Figure 4A:
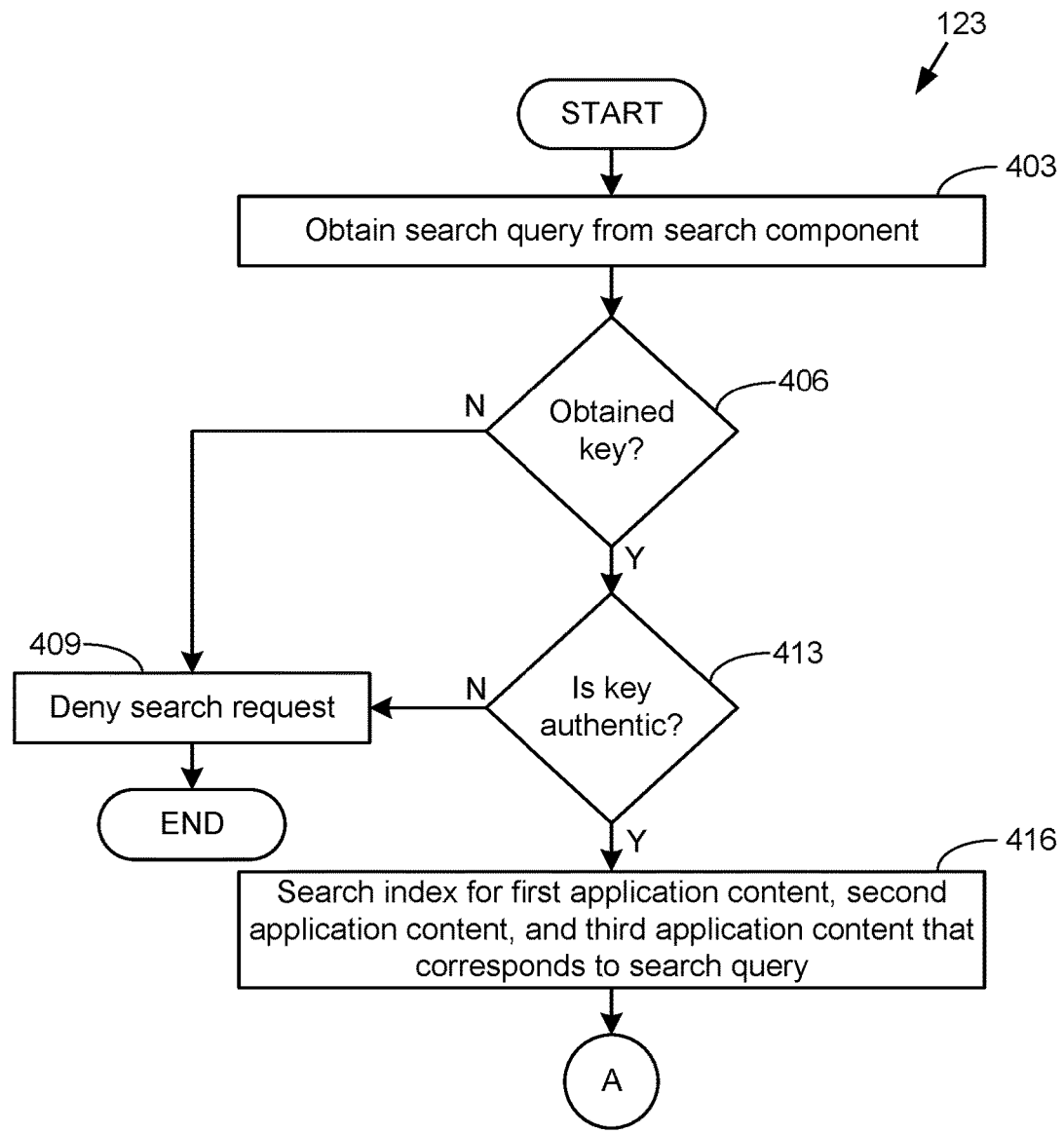
Figure 4B:
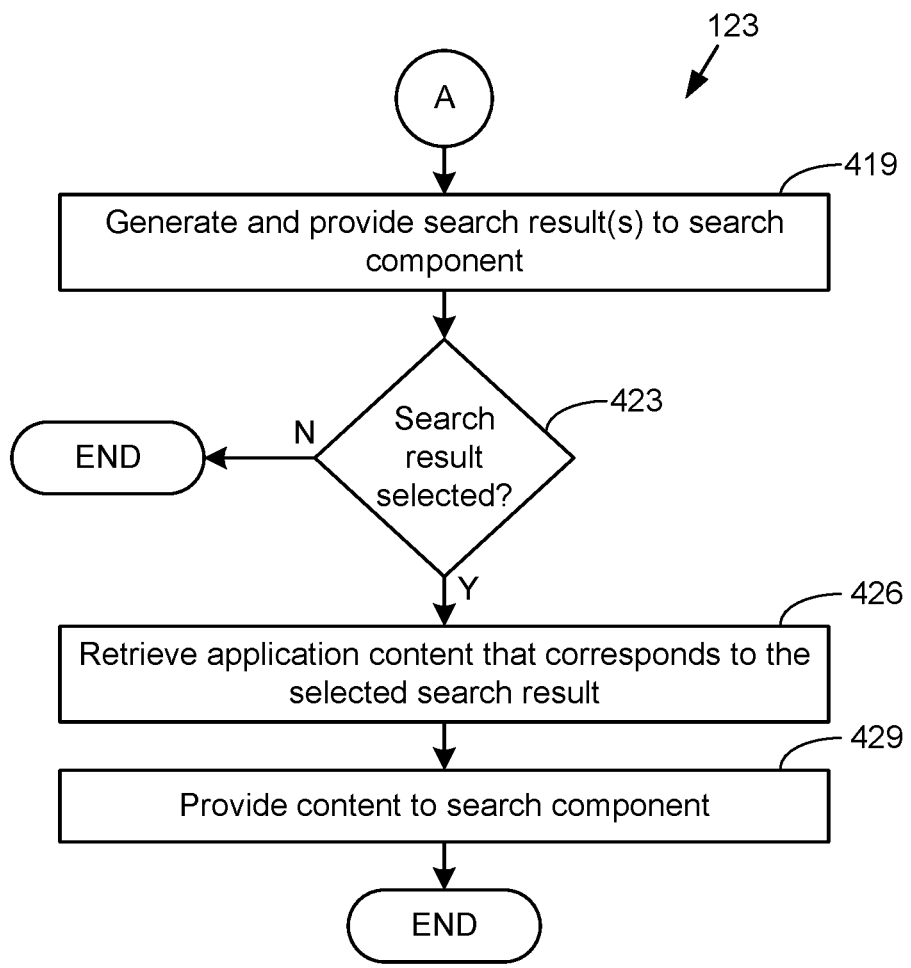

With reference to FIGS. 4A-4B, shown is a flowchart that provides another example of a portion of the operation of the search interface component 123. In particular, FIGS. 4A-4B provide another example of the search interface component 123 receiving a search query from the search component 119 and providing the search component 119 with search results. The flowchart of FIGS. 4A-4B can be viewed as depicting an example of a method implemented in the client device 106.

Beginning with step 403, the search interface component 123 can obtain a search query from the search component 119. The search query can include a string of text that the user of the client device 106 input into the search component 119.

At step 406, the search interface component 123 can then determine whether the search interface component 123 obtained a communication key from the search component 119. The communication key can indicate that the search interface component 123 is authorized to perform a search at the request of the search component 119. In some examples, the communication key can be seeded in the search component 119 when the search component 119 is made into a managed component through the SDK or wrapping processes described above.

If the search interface component 123 did not obtain the communication key, the search interface component 123 can move to step 409 and deny the search request made by the search component 119. Otherwise, if the search interface component 123 did obtain a communication key, the search interface component 123 can move to step 413 and determine whether the received communication key is authentic. If the communication key is not authentic, the search interface component 123 can move to step 409 and deny the search request made by the search component 119.

If the communication key is authentic, the search interface component 123 can move to step 416. As indicated at step 416, the search interface component 123 can search an index for first application content 126a, second application content 126b, and third application content 126c that corresponds to the search query. As described above, the search index can be generated by the search interface component 123 periodically crawling the application content 126 in the client data store 115. In addition, the search index can be populated by recording information retrieved if the applications 116 provide the search interface component 123 with search results.

The search interface component 123 can then move to step 419, which is shown in FIG. 4B. As shown at step 419, the search interface component 123 can then generate and provide search results to the search component 119. The search results can identify the particular application content 126 that corresponds to the search query. In addition, the search results can identify the applications 116 to which the application content 126 correspond. The search result can also represent metadata for the application 116, such as a file's name, creator, and creation data.

Then, as shown at step 423, the search interface component 123 can then determine whether the user of the client device 106 has selected one of the search results. To this end, the search component 119 can notify the search interface component 123 that the user selected a particular search result. If a user did not select a search result, the process ends.

Otherwise, if the user selected a search result, the search interface component 123 can move to step 426 and retrieve the application content 126 that corresponds to the selected search result. In some examples, the search interface component 123 can retrieve the specified application content 126 by requesting the corresponding application 116 to transfer the application content 126 to the search interface component 123. In other examples, the search interface component 123 can access the client data store 115 to retrieve the application content 126.

After the search interface component 123 has obtained the application content 126, the search interface component 123 can move to step 429 and provide the retrieved content to the search component 119. In alternative examples, instead of retrieving the application content 126 and providing the application content 126 to the search component 119, the search interface component 123 can cause the application 116 for the application content 126 to become active in the client device 106. In addition, the search interface component 123 can instruct the application 116 to open the application content 126 that corresponds to the selected search result. Thereafter, the process ends.

The flowcharts of FIGS. 2, 3A-3B, and 4A-4B show examples of the functionality and operation of implementations of components described herein. The components of the networked environment 100 described herein can be embodied in hardware, software, or a combination of hardware and software. If embodied in software, each step in the flowcharts of FIGS. 2, 3A-3B, and 4A-4B can represent a module or a portion of code that includes computer instructions to implement the specified logical functions. The computer instructions can include source code that comprises human-readable statements written in a programming language or machine code that comprises machine instructions recognizable by a suitable execution system, such as a processor in a computer system. If embodied in hardware, each step can represent a circuit or a number of interconnected circuits that implement the specified logical functions.

Although the flowcharts show a specific order of execution, the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid.

The enterprise computing environment 103 and client device 106 described herein can include at least one processing circuit. Such a processing circuit can include one or more processors and one or more storage devices that are coupled to a local interface. The local interface can include a data bus with an accompanying address/control bus.

A storage device for a processing circuit can store data and components that are executable by the one or more processors of the processing circuit. In some examples, portions of the management service 113, the search component 119, the search interface component 123, and the applications 116 can be stored in one or more storage devices and be executable by one or more processors. Also, the client data store 115 can be located in the one or more storage devices.

The management service 113, the search component 119, the search interface component 123, and the applications 116 can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or computer instructions can be embodied in any non-transitory computer-readable medium for use by or in connection with an instruction execution system such as, for example, a processor in a computer system or other system. Such a computer-readable medium can contain, store, and maintain the software or computer instructions for use by or in connection with the instruction execution system.

A computer-readable medium can comprise a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

Therefore, the following is claimed:

1. A system, comprising:
    a computing device; and
    a search interface component executable by the computing device, wherein the search interface component, when executed by the computing device, is configured to cause the computing device to at least:
        obtain a search query from a search component;
        validate the search query in response to an authentication of a key associated with the search component;
        search a search index for first application content that corresponds to the search query and second application content that corresponds to the search query, wherein the first application content is secured within a first sandbox for a first application and the second application content is secured within a second sandbox for a second application; and
        provide at least one search result to the search component based upon the search index, wherein the at least one search result is based at least in part on the first application content that corresponds to the search query or the second application content that corresponds to the search query.

2. The system of claim 1, wherein the search interface component is further configured to cause the computing device to update the search index based at least in part on crawling restricted application content stored in the computing device.

3. The system of claim 1, wherein the search interface component is further configured to cause the computing device to update the search index based at least in part on a plurality of previous search queries associated with restricted application content.

4. The system of claim 1, wherein access to the first application content and the second application content are restricted based on a signature-based permission model;
    wherein the search interface component is signed with a certificate key;
    wherein the first application is signed with the certificate key;
    wherein the second application is signed with the certificate key; and
    wherein the search component is not signed with the certificate key.

5. The system of claim 1, wherein the key is integrated with the search component by modifying decompiled code associated with the search component to include the key.

6. The system of claim 1, wherein the search interface component is further configured to cause the computing device to retrieve the first application content or the second application content in response to a selection of the at least one search result.

7. The system of claim 6, wherein the first application content or the second application is retrieved by:
    instructing the first application or the second application to become active; and
    instructing the first application or the second application to open a selected application content corresponding with the at least one search result.

8. The system of claim 6, wherein the first application content or the second application is retrieved by:
    instructing the first application or the second application to become active;
    requesting the first application or the second application to provide a selected application content corresponding with the at least one search result; and
    transferring the selected application content to the search component.

9. A non-transitory computer-readable medium storing a plurality of computer instructions executable by a computing device, the plurality of computer instructions being configured to cause the computing device to at least:
    obtain a search query from a search component;
    validate the search query in response to an authentication of a key associated with the search component;
    search a search index for first application content that corresponds to the search query and second application content that corresponds to the search query, wherein the first application content is secured within a first sandbox for a first application and the second application content is secured within a second sandbox for a second application; and
    provide at least one search result to the search component based upon the search index, wherein the at least one search result is based at least in part on the first application content that corresponds to the search query or the second application content that corresponds to the search query.

10. The non-transitory computer-readable medium of claim 9, wherein the plurality of computer instructions further cause the computing device to update the search index based at least in part on crawling restricted application content stored in the computing device.

11. The non-transitory computer-readable medium of claim 9, wherein the plurality of computer instructions further cause the computing device to update the search index based at least in part on a plurality of previous search queries associated with restricted application content.

12. The non-transitory computer-readable medium of claim 9, wherein the key is integrated with the search component by modifying decompiled code associated with the search component to include the key.

13. The non-transitory computer-readable medium of claim 9, wherein the plurality of computer instructions further cause the computing device to retrieve the first application content or the second application content in response to a selection of the at least one search result.

14. The non-transitory computer-readable medium of claim 13, wherein the first application content or the second application is retrieved by:
    instructing the first application or the second application to become active; and instructing the first application or the second application to open a selected application content corresponding with the at least one search result.

15. The non-transitory computer-readable medium of claim 13, wherein the first application content or the second application is retrieved by:

instructing the first application or the second application to become active;

requesting the first application or the second application to provide a selected application content corresponding with the at least one search result; and transferring the selected application content to the search component.

16. A method, comprising:

obtaining, by a search interface component executed by at least one computing device, a search query from a search component;

validating, by the search interface component, the search query in response to an authentication of a key associated with the search component;

searching, by the search interface component, a search index for first application content that corresponds to the search query and second application content that corresponds to the search query, wherein the first application content is secured within a first sandbox for a first application and the second application content is secured within a second sandbox for a second application; and providing, by the search interface component, at least one search result to the search component based upon the search index, wherein the at least one search result is based at least in part on the first application content that corresponds to the search query or the second application content that corresponds to the search query.

17. The method of claim 16, further comprising updating, by the at least one computing device, the search index based at least in part on crawling restricted application content stored in the computing device.

18. The method of claim 16, further comprising updating, by the at least one computing device, the search index based at least in part on a plurality of previous search queries associated with restricted application content.

19. The method of claim 16, wherein the key is integrated with the search component by modifying decompiled code associated with the search component to include the key.

20. The method of claim 16, wherein the search interface component is further configured to cause the computing device to retrieve the first application content or the second application content in response to a selection of the at least one search result.

* * * * *